United States Patent [19]

Lush

[11] Patent Number: 5,196,225
[45] Date of Patent: Mar. 23, 1993

[54] PREPARED FOOD PRODUCT WITH SWEET CORN AND METHOD OF PREPARING SAME

[76] Inventor: Raymon W. Lush, 205 N. Broadway, Bloomfield, Nebr. 68718

[21] Appl. No.: 541,263

[22] Filed: Jun. 20, 1990

[51] Int. Cl.$^5$ .............................................. A23L 1/10
[52] U.S. Cl. ................... 426/560; 426/463; 426/618; 426/620; 426/626
[58] Field of Search ............... 426/618, 626, 560, 620, 426/463

[56] References Cited

U.S. PATENT DOCUMENTS

| | | | |
|---|---|---|---|
| 4,564,531 | 1/1986 | Ohgami et al. | 426/618 |
| 4,743,460 | 5/1988 | Gellman et al. | 426/805 |
| 4,746,531 | 5/1988 | Lush | 426/807 |

Primary Examiner—Jeanette Hunter
Assistant Examiner—Mary S. Mims
Attorney, Agent, or Firm—John A. Beehner

[57] ABSTRACT

A method for improving a prepared food product of the type with ground field corn, includes grinding mature sweet corn to produce ground sweet corn and substituting that ground sweet corn for at least a portion of the ground field corn ingredient of the food product. The food product is then prepared in the usual manner with the mature ground sweet corn. The invention is directed to the improved prepared food product, as well as to the method of preparing it.

The method of the invention is applicable for enhancing both human food products as well as various pet food products.

7 Claims, No Drawings

PREPARED FOOD PRODUCT WITH SWEET CORN AND METHOD OF PREPARING SAME

BACKGROUND OF THE INVENTION

The present invention is directed generally to a method for improving a prepared food product and to a prepared food product wherein ground mature sweet corn is substituted for at least a portion of the ground field corn ingredient of the food product to enhance both the nutrition and taste of the prepared food product. Historically, sweet corn was grown for three purposes:

(1) To be harvested in the ear in the milk stage to be consumed by the general public to be eaten off the ear;

(2) To be harvested in the ear in the milk stage to be either canned or frozen in the kernel form by the public or commercial concerns;

(3) A very minute percentage of the product is grown for the reproduction of seed in which case the sweet corn is left to mature further in the field. The variety of the sweet corn will dictate the stage of maturity for optimum harvest of high germination seed for resale as hybrid or open pollinated sweet corn seed. Only recently this inventor's own U.S. Pat. Nos. 4,746,531 and 4,815,923 have taught that dried mature sweet corn will enhance transition feeds for swine and provide a very attractive inert ingredient for rodenticides.

The use of sweet corn in human food product in any form other than the moist early milk stage of the sweet corn has been very limited. One such use has been as a snack food wherein whole sweet corn kernels are deep fat fried to produce a sweet corn crunch or sweet corn nuts. Another commercial concern sells dehydrated sweet corn. That is sweet corn that is picked in the moist milk stage and dehydrated. One simply needs to add water prior to consumption of the sweet corn.

One known prior attempt to make flour from sweet corn was unsuccessful in part because of the mistaken belief that it was necessary to degerm the sweet corn. Sweet corn is known to have a very high content of oil and approximately ninety percent (90%) of the oil is in the germ. Accordingly, it was thought that degerming of the sweet corn was necessary to get rid of the oil which would make the flour rancid in a short time.

The food industry and consumers alike are looking for products that don't need preservatives. Whereas it is necessary for food products to have sufficient shelf life to prevent spoilage prior to normal usage, health conscious consumers tend to avoid those food products which include preservatives. At the same time, the snack food market is ever increasing. There is a need and ready market for snack foods having improved taste and texture.

Accordingly, a primary object of the invention is to provide an improved prepared food product including ground mature sweet corn as an ingredient thereof.

Another object is to provide an improved prepared food product having a long shelf life without any added preservatives.

Another object is to provide an improved prepared food product having enhanced taste and texture.

Another object is to provide an improved pet food product and method of preparing such a product which has both enhanced nutrition and palatability.

Another object is to provide improved prepared food products which simply come easily prepared, tasty and nutritious.

SUMMARY OF THE INVENTION

The present invention is directed to a method for improving a prepared food product of the type made with ingredients, such as ground field corn. The method, according to the present invention, includes providing mature sweet corn and grinding it to produce a ground sweet corn. The ground sweet corn then substituted for at least a portion of the ground field corn ingredient of the food product whereupon the food product is prepared in the usual fashion, but the with mature ground sweet corn. Whereas the ground sweet corn may be substituted for all of the ground field corn ingredient of a food product, it is generally preferred that the sweet corn be substituted for between about five and twenty-five percent (5-25%) thereof. This is both because of economics and because the high sugar content of sweet corn tends to make the food product slurry sticky and difficult to handle during preparation. Prepared food products which may be enhanced with the inclusion of ground mature sweet corn include tortilla chips, taco shells, flour, cornmeal, corn flakes cereal and corn oil.

The present invention is furthermore directed to the preparation of improved pet food products wherein mature sweet corn is included as an ingredient of the pet food product in a proportion with respect to the other ingredients thereof, such that palatability of the pet food product is enhanced while maintaining the pet food product balanced for protein, fiber, energy and palatability. Specialized pet food products for dogs, cats, and other pets may be prepared.

DESCRIPTION OF THE PREFERRED EMBODIMENT

The improved prepared food product of the present invention is prepared in the usual manner, but with ground mature sweet corn substituted for at least a portion of the usual ground field corn ingredient of the food product. Zea Mays Saccharata is the botanical name for sweet corn, which is also referred to by International Feed No. 40297. It is important to distinguish the vegetable "sweet corn" from the grain "field corn." "Field corn" is broadly used herein to collectively refer to various types of corn which are normally grown either for feeding livestock or for use as ingredients in prepared food products. Examples of types of field corn include yellow dent corn, flint corn, soft corn, and in some cases, grain sorghum.

Sweet corn is normally grown for human consumption and is harvested in the ear while the kernel is in the relatively soft and moist milk stage. The soft and moist sweet corn has limited utility in prepared food products because of its short shelf life due to spoilage and the difficulty of handling, dividing and mixing the soft and moist kernels.

For use in the present invention, however, sweet corn is dried down to a dented state. Dried sweet corn herein refers to sweet corn having a moisture content of fifteen percent (15%) or less. A moisture content of ten percent (10%) or below is preferred. The sweet corn may be planted and cultivated in the same manner as field corn and is left in the field to mature past the milk stage, which is the normal harvest period for sweet corn. It is left in the field to mature as long as possible to allow maximum dry-down of the kernel before ear dropage and stalk lodging occurs to the point that it is no longer economically feasible to harvest.

The dried sweet corn is then ground to whatever degree is desired. "Grinding" herein collectively refers to such processes as crushing, grinding, rolling, flaking, flouring, degerming, milling, or otherwise reducing the kernel to a smaller particle size, with the end result hereinafter referred to as ground sweet corn. A double grinding process is generally preferred for a more uniformed particle size in the dried ground sweet corn. In some methods of processing, a separate grinding step is not necessary in order to reduce the kernel to smaller particles since this effectively occurs as a result of the process itself. Examples of these processes include the extrusion process and texturizing. The result and in product is nevertheless referred to herein as ground sweet corn.

The extent of grinding will be determined largely by the nature of the prepared food product. Certainly very fine grinding is required for the production of corn flour. The sweet corn need only be coarse ground for preparation of taco shells whereas fine grinding is generally utilized in the preparation of tortilla chips.

The sweet corn, either before or after it is ground, also may be heat processed, by for example, roasting, baking, toasting, extruding, expelling, exploding, flaking, cooking, micronizing, steam processed flaking, pressure process flaking, or popping (hereinafter collectively referred to as roasting with the end result referred to as roasted sweet corn). One purpose of roasting is to enhance the conversion of starches in the sweet corn to sugars. Other chemical changes likewise may take place.

The ground roasted or ground unroasted sweet corn is then substituted or added with ground field corn in the ingredients of the prepared food product which is then prepared in the usual manner. Examples of such food products include tortilla chips, taco shells, flour, corn meal, corn flakes cereal and corn oil, among others. The processing varies according to the type of food product. For example, the ingredients for taco shells are generally coarse ground, baked and then placed in a deep fat fryer. The ingredients of tortilla chips, on the other hand, are fine ground, not baked and cooked in a deep fat fryer.

Corn chips that were prepared with sweet corn substituted for ten (10) to fifteen (15) percent (%) of the ground field corn ingredient have been prepared and tested and found to have a decidedly improved taste and texture. The taste was fresher and the texture was crispier than conventionally prepared corn chips without any sweet corn in the ingredients thereof. In the preparation of masa flour, equal parts of dry mature corn and water are combined with lime in a portion that is equal to approximately one percent (1%) of the portion of corn. The mixture is boiled for twenty (20) minutes and set overnight. The water is drained off and the corn is washed. The lime helps remove some of the hulls, changes some of the starches to sugar and adds flavor.

The advantages of substituting ground sweet corn for ground field corn in prepared food products are not limited to food products for human consumption. Enhanced nutrition and palatability for prepared pet food products is likewise achievable by substituting ground sweet corn for at least a portion of the ground field corn ingredient, or other carbohydrate source ingredients of such products.

The following is an example of a twenty-one percent (21%) extruded dog food both in its conventional form and with sweet corn added.

| CONVENTIONAL 21% DOG FOOD (EXTRUDED) | |
|---|---|
| Yellow Corn (8½%) | 895 |
| Soybean Meal (44%) | 500 |
| Meat & Bone Meal (50%) | 240 |
| Wheat Midds (15%) | 230 |
| Fat (Dry Fat 90%) | 115 |
| Salt | 10 |
| Dyna K | 5 |
| Premium Dog Premix | 5 |
| Total | 2,000 |
| SWEET CORN ADDED 21% DOG FOOD (EXTRUDED) | |
| Sweet Corn (12%) | 1,100 |
| Soybean Meal (44%) | 340 |
| Meat & Bone Meal (50%) | 240 |
| Wheat Midds (15%) | 230 |
| Fat | 70 |
| Salt | 10 |
| Dyna K | 5 |
| Premium Dog Premix | 5 |
| Total | 2,000 |

The nutritional content of the sweet enhanced dog food product is calculated to be as follows:

| NUTRITIONAL CONTENT | |
|---|---|
| Protein % | 21.80 |
| Fat % | 8.86 |
| Fiber % | 3.92 |
| Calcium % | 1.17 |
| Phosphorus % | 0.91 |

This feed can be feed as the sole diet to both growing and mature dogs. Plenty of fresh water should be provided at all times. The following chart is provided as a guide for the approximate amount of feed for daily rations:

| FEED GUIDE ONLY | |
|---|---|
| Weight of Dog | Amount of Feed/Day |
| 3–12 lbs. | 2–6 ounces |
| 12–25 lbs. | 6–12 ounces |
| 25–50 lbs. | ¾–1¼ lbs. |
| 50–100 lbs. | 1¼–3 lbs. |

Whereas the illustrated example pertains to a dog food, it is apparent that ground sweet corn may likewise be substituted into prepared cat food and food for other pets.

The substitution of ground sweet corn for the ground field corn or other carbohydrate source ingredient of any prepared food product is advantageous for two reasons, namely, improved nutrition and longer shelf life. It is known that sweet corn has approximately four to eight (4–8) times the sugar content of field corn. The substitution of sweet corn for the field corn necessarily results in increased nutrient value for the prepared food product in addition to the improved taste of the sweet corn. Sweet corn has a higher protein content than any other corn and higher fat, higher nutrient value and higher fiber than most corn.

Since sweet corn is believed to either contain natural preservatives, or simply lack the enzymes that cause mold to form, the substitution of the ground sweet corn is expected to serve as at least a partial natural preservative for the prepared food product. Whereas the invention has been shown and described herein in connection with preferred embodiments thereof, it is understood that many modifications, substitutions and additions may be made which are within the intended broad scope of the appended claims.

Thus there has been shown and described an improved prepared food product and method which accomplish at least all of the stated objects.

I claim:

1. A method for improving a prepared food product selected from the group consisting of tortilla chips, taco shells, flour, cornmeal, corn flakes cereal and corn oil, and made with ingredients including ground field corn, comprising,
   providing the ingredients for said prepared food product,
   providing mature sweet corn,
   grinding said mature sweet corn to produce ground sweet corn,
   substituting said ground sweet corn for at least a portion of the ground field corn ingredient of said food product, and
   preparing said food product with said mature ground sweet corn.

2. The method of claim 1 further comprising roasting said mature sweet corn, said substituting step comprising substituting said ground roasted sweet corn for at least a portion of the ground field corn ingredient of said food product.

3. The method of claim 2 wherein said substituting step comprises substituting said ground roasted sweet corn for between five and twenty-five percent (5%-25%) of the ground field corn ingredient of said food product.

4. The method of claim 1 wherein ground sweet corn is substituted for all of the ground field corn ingredient of said food product.

5. In a prepared food product selected from the group consisting of tortilla chips, taco chips, taco shells, flour, cornmeal, cornflakes cereal and corn oil, and made with ingredients including ground field corn, the improvement comprising the inclusion of ground mature sweet corn as an ingredient of said food product in a proportion with respect to the other of said ingredients thereof, such that the palatability of said food product is enhanced.

6. The method of claim 3 wherein said step of providing mature sweet corn comprises sweet corn with a moisture content of 10% or less.

7. The method of claim 6 wherein the step of grinding said mature sweet corn to produce ground sweet corn further includes double grinding of said mature sweet corn to produce a uniform particle size.

* * * * *